United States Patent [19]

Inkrott et al.

[11] Patent Number: 4,520,121

[45] Date of Patent: May 28, 1985

[54] MAGNESIUM HALIDE HYDRATES AND POLYMERIZATION CATALYSTS PREPARED THEREFROM

[76] Inventors: Kenneth E. Inkrott; Gil R. Hawley, both of Bartlesville, Okla.

[73] Assignee: Phillips Petroleum Company, Bartlesville, Okla.

[21] Appl. No.: 546,712

[22] Filed: Oct. 28, 1983

[51] Int. Cl.³ .............................................. C08F 4/63
[52] U.S. Cl. .................................... 502/105; 502/119;
502/127; 502/134; 526/119; 526/125; 423/497
[58] Field of Search ................. 502/105, 119, 127, 134

[56] References Cited

U.S. PATENT DOCUMENTS

| | | | |
|---|---|---|---|
| 1,389,546 | 8/1921 | Dow | 423/498 |
| 1,479,982 | 1/1924 | Collings et al. | 423/498 |
| 1,557,660 | 10/1925 | Cottringer et al. | 423/498 |
| 1,592,971 | 7/1926 | Dow | 428/403 |
| 3,803,105 | 4/1974 | Galli et al. | 502/134 X |
| 4,143,223 | 3/1979 | Toyota et al. | 526/125 |
| 4,294,721 | 10/1981 | Cecchin et al. | 526/125 X |
| 4,296,223 | 10/1981 | Berger | 526/125 |
| 4,394,291 | 7/1983 | Hawley | 502/127 |

FOREIGN PATENT DOCUMENTS 2102439A 2/1983 United Kingdom ............... 502/127

*Primary Examiner*—Patrick Garvin

[57] ABSTRACT

An inexpensive one-step process is disclosed for producing the lower hydrates of magnesium dihalide by comminuting hydrated magnesium dihalide and anhydrous magnesium dihalide. Also the use of such hydrous magnesium dihalide products in the olefin polymerization catalysts.

14 Claims, 5 Drawing Figures

MAGNESIUM HALIDE HYDRATES AND POLYMERIZATION CATALYSTS PREPARED THEREFROM

The present invention relates to a novel method for preparing magnesium halide hydrates. In another aspect the present invention relates to polymerization catalysts prepared from at least some of those magnesium halide hydrates.

Known processes for the synthesis of the lower hydrates of $MgCl_2$ involve complicated methods for water removal from $MgCl_2.6H_2O$, such as liquid ammonia solution, washing, and drying, etc. The addition of water to liquid slurries of anhydrous $MgCl_2$ also presents problems, including the fact that when done in large scale batches, agglomeration occurs which inhibits the formation of homogeneous products. While the mere blending of hydrous and anhydrous magnesium halide as by mixing in a liquid in a Waring Blendor has also been found to yield products comprising an admixture of anhydrous and one or more hydrous magnesium halide, such a process also requires the separation of the magnesium halide and the liquid when there is a need for the magnesium halide as a solid. This latter technique has also been found to yield a mixture of hydrates, at least some of which are considered undesirable when the product is used to make certain olefin polymerization catalysts.

One object of the present invention is to provide a simple, economical, one-step method of obtaining substantially homogeneous hydrous magnesium halide compositions.

Another object of the present invention is to provide a method for producing substantially pure forms of $MgCl_2.H_2O$, $MgCl_2.2H_2O$, or $MgCl_2.4H_2O$ from higher magnesium chloride hydrates.

Still another object of the present invention is to prepare a hydrate of magnesium dihalide that is substantially free of higher hydrates which have been shown to have an adverse effect upon the activity of magnesium dihalide derived olefin polymerization catalysts.

Still another object of the present invention is to provide high activity olefin polymerization catalysts prepared using the hydrous magnesium halide compositions of the present invention.

SUMMARY OF THE INVENTION

In accordance with the present invention a hydrate of a magnesium dihalide is produced by comminuting a mixture of an anhydrous magnesium dihalide and a hydrous magnesium dihalide at least until the amount of the most highly hydrated magnesium dihalide species in the comminuted product has become substantially stabilized.

In accordance with yet another embodiment of the present invention a catalyst suitable for the polymerization of olefins is prepared by using a hydrous magnesium dihalide composition with reactants comprising benzoic acid ester and an alkoxytitanium compound to form a first catalyst component, then reacting said first catalyst component with an organoaluminum halide to form a solid product, then reacting the solid product with a halogenating agent comprising a titanium halide, wherein the molar ratio of water to magnesium dihalide in said hydrous magnesium dihalide composition is in the range of 0.5/1 to 2/1 and the hydrous magnesium dihalide composition is prepared as described in the preceding paragraph.

DETAILED DESCRIPTION OF THE INVENTION

Figure 1:
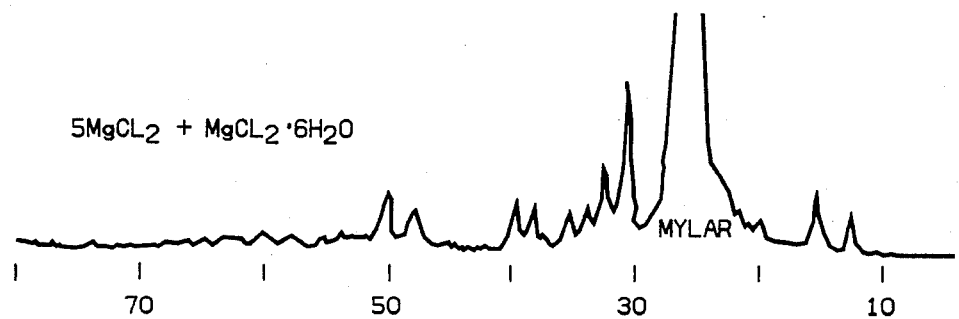
FIGS. 1–5 are copies of the powder X-ray diffraction spectra of the products produced by ball milling anhydrous $MgCl_2$ and $MgCl_2.6H_2O$ at different molar ratios.

The term "anhydrous magnesium dihalide" is used herein to refer to magnesium dihalides containing less than 0.5 mole of water per mole of magnesium dihalide. The term "hydrous" magnesium dihalide on the other hand is used herein to refer to those magnesium dihalides containing 0.5 mole of water or more. The level of water can be determined using routine analysis techniques. Typically, such techniques involve the use of Karl Fischer titration and volumetric gas analysis from reaction with a Grignard reagent plus other conventional techniques such as X-ray diffraction and elemental analysis for determining the amounts of any other materials, such as MgO, associated with the magnesium dihalide.

The relative amounts of anhydrous magnesium dihalide and hydrous magnesium dihalide employed will be dependent upon the amounts of water associated with the hydrous and anhydrous magnesium dihalides and the desired molar ratio of magnesium dihalide to water in the final product. It is generally preferred to use an anhydrous magnesium dihalide that contains less than about 0.1 weight percent water, more preferably less than 0.05 weight percent water. When such as anhydrous magnesium dihalide is used with a hexahydrated magnesium dihalide it would generally be used in amounts such that the molar ratio of the anhydrous magnesium dihalide to the hydrous is in the range of about 0.2/1 to about 25/1, more often in the range of about 2/1 to about 11/1.

The comminution may be effected using any device which provides sufficient pulverization of the solids. One suitable device is a ball mill. The balls and the interior of the mill are preferably made of a material that is resistant to corrosion. Typically in such devices the balls will have a diameter in the range of about 1/10 to about 1/6 of the diameter of the internal diameter of the mill. The severity of the comminution as known depends upon the size of the balls, the number of balls, the milling time, and the amount of the material placed in the mill for grinding. Typically about one-third to about nine-tenths of the volume of the mill is filled with balls and the material to be ground is added in an amount which ranges from the void volume of the loading of balls to about half the void volume of the loading of the balls. The void volume of the loading of the balls can readily be determined by placing in loading of balls in a vessel and then determining the volume of water needed to just cover the loading of balls.

The temperature of the comminution is not particularly critical so long as it is carried out in a sealed vessel. However, typically it is desired that the temperature of the comminuted mixture be kept below 100° C. This can be done by applying cooling water or the like to the milling during the grinding process. It is also preferred that the grinding be conducted in an atmosphere substantially free of water. Therefore it is desirable to load and unload the mill in a dry box.

The hydrous magnesium dihalide compositions prepared as described above are useful for preparing olefin polymerization catalysts of the general type disclosed in U.S. Pat. No. 4,394,291, the disclosure of which is incorporated herein by reference. The preferred hydrous magnesium dihalide compositions for use in preparing such catalysts are those in which the molar ratio of water to magnesium dihalide is in the range of about 0.5/1 to about 2/1.

The catalysts are prepared from alkoxytitanium compounds selected from those titanium compounds in which the titanium is bonded to at least one oxygen atom and the oxygen atom is bonded to at least one alkyl radical. The preferred alkoxytitanium compounds are those of the formula $$Ti(OR)_4$$

wherein each R is individually selected from an alkyl group containing 1 to 20 carbon atoms and each R can be the same or different. The most preferred are those in which each alkyl group contains 1 to 10 carbon atoms.

The molar ratio of the alkoxytitanium compound to the metal halide compound can be selected over a relatively broad range. Generally, the molar ratio of alkoxytitanium to magnesium dihalide is in the range of about 10/1 to 1/10, more preferably about 2/1 to 1/2.

The term benzoic acid ester is used generically to include substituted as well as unsubstituted benzoic acid esters. Typical examples include ethyl benzoate, ethyl p-methoxybenzoate, ethyl toluate, ethyl p-butoxybezoate, and butyl benzoate. The preferred benzoic acid esters are those having 8 to 12 carbon atoms per molecule.

In an especially preferred embodiment, a phenol is employed in conjunction with the benzoic acid in making the first catalyst component. The term "phenol" is used herein to refer to substituted as well as unsubstituted phenols. Typical examples include phenol, o-methyl phenol, m-methyl phenol, p-methyl phenol, 4-phenyl phenol, o-fluorophenol, m-fluorophenol, p-fluorophenol, p-sec-butyl phenol, p-ethyl phenol, p-isopropyl phenol, p-tertbutyl phenol, p-metoxy phenol, p-cyanophenol, and p-nitrophenol.

The currently preferred combination of ester and phenol is 4-phenyl phenol and ethyl benzoate. The total number of moles of 4-phenyl phenol and ethyl benzoate employed can affect the activity and selectivity of the resulting catalyst. Typically, the ratio of the sum of the moles of those two electron donors to the moles of the titanium alkoxide are in the range of about 5/1 to 1/5, more preferably 3/1 to 2/1. Most preferably, ½ mole of ethyl benzoate is employed per mole of titanium alkoxide.

The formation of the first catalyst component is conducted by reacting the resulting hydrated magnesium dihalide with the titanium compound and a benzoic acid ester, and optionally and preferably with a phenol. The reaction is conducted in a suitable hydrocarbon solvent or diluent substantially free of free water. Examples include n-pentane, n-heptane, methylcyclohexane, toluene, xylenes, and the like. The amount of solvent or diluent can be selected over a broad range. Usually the amount of solvent or diluent would be within the range of about 20 to about 100 cc per gram of metal dihalide.

Generally, it is preferred to combine the hydrated magnesium dihalide and the titanium compound at a temperature in the range of about 0° C. to about 50° C., more preferably about 10° C. to about 30° C. The reaction between the reactants of the first catalyst component is carried out at a temperature in the range of about 15° C. to about 150° C. Typically, the reaction is carried out by refluxing the mixture.

While it is not absolutely critical, it is currently preferred to mix the magnesium dihalide and the titanium compound and optionally the phenol at a temperature in the range of 20° C. to 40° C., then to heat the mixture to 90°–100° C. for a few minutes, and then to add the ester at that temperature and maintain the mixture at a temperature of about 90°–100° C. to complete the reaction.

Generally, the time required for heating the reactants to make the first catalyst component is within the range of about 5 minutes to about 10 hours, although in most instances a time within the range of about 15 minutes to 3 hours is sufficient.

The reaction of the organoaluminum halide with the first catalyst component can be carried out by merely adding the organoaluminum halide to a solution of the first component. It is, however, currently preferred to add a hydrocarbon solution of the halide to the first component solution.

The temperature employed for reacting the second catalyst component, i.e., the organoaluminum halide, and the first catalyst component can be selected over a broad range. Generally, the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. However, it is preferable to add the second component to the first. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes, and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

Generally, the reaction between solid product resulting from the reaction of the first and second components with the halide ion exchanging source can be carried out neat or in a liquid medium in which the halide ion exchanging source is soluble. The product from step (2) is generally in a liquid diluent when contacted with the halide ion exchanging source. Any suitable diluent can be employed. Examples include normally liquid hydrocarbon such as n-pentane, n-heptane, cyclohexane, benzene, and xylene.

The temperature employed in step (3) can be selected over a relatively broad range, generally in the range of −25° C. to +250° C., preferably 0° C. to 200° C., with temperatures of 100° C. being most preferred.

The treating time can also be selected over a broad range and generally is within the range of about 10 minutes to about 10 hours. While the weight ratio of the halide ion exchanging source to the product of step (2) can be selected over a relatively broad range, the weight ratio of the halide ion exchanging source to the product of step (2) is generally within a range of about 10:1 to about 1:10 and more generally from about 7:1 to about 1:4. Following the treatment of the product of step (2) with the halide ion exchanging source the surplus halide ion exchanging source is removed by washing the solid catalyst with a dry (essential absence of water) liquid such as a hydrocarbon of the type previously disclosed, n-hexane, or xylene, for example. The resulting catalyst, after drying, is stored under dry nitrogen.

The currently preferred titanium halide for use as the halide ion exchanging source is $TiCl_4$. In an especially preferred embodiment, the $TiCl_4$ is employed in conjunction with a halide of silicon such as $HSiCl_3$ and/or $SiCl_4$.

The catalyst of the present invention can be used in the polymerization of olefins. Olefins which can be homopolymerized or copolymerized with the invention catalysts inlcude aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include, for example, styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II and IIIA of the Periodic Table. Of the organometallic cocatalysts, organoaluminum compounds such as those described above as suitable for use as the second component of the catalyst, are preferred with the most preferred organoaluminum cocatalysts being compounds of the formula $R_3Al$ which include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

The catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is obtained when the TEA:ester mole ratio is about 2:1. The DEAC, when used, helps in increasing activity. Generally, a TEA:ester:DEAC mole ratio ranging from about 2:1:0.5–3 and preferably about 2:1:2 is employed in bench scale testing for batch polymerization. For a continuous, larger scale process, it becomes possible, for example, when using TEA and MPT to use TEA:MPT mole ratios of about 3:1 to about 5:1 and dispense with the DEAC entirely. A decreased DEAC level is desirable when employing a flash process to recover polymer since the amount of chloride remaining in the polymer is dependent to some extent on the DEAC level.

For the production of polyethylene the catalyst is preferably used with a cocatalyst consisting of a trialkylaluminum, such as triethylaluminum. It is further possible to obtain high activity in ethylene polymerization by using about 1 mole of ethylbenzoate per mole of titanium alkoxide and hydrous magnesium dihalide having lower levels of water than that needed for comparable activity when less ethylbenzoate is employed.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed, either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples.

EXAMPLE I

Production of lower hydrates of $MgCl_2$

In each example, a dry, clean, spherical steel vessel of 210 mL capacity containing 110, 7/16 inch (1.1 cm) chrome steel balls (621 g) was brought into a dry box and loaded with the specified weights of anhydrous $MgCl_2$ and $MgCl_2.6H_2O$. The vessel was capped, removed from the dry box and attached to a Model 6L-B Siebtechnik vibration mill, operating at 1760 oscillations per minute with an amplitude of about ¼ inch (0.6 cm). Milling time was 4.0 hours while the vessel was generally cooled with spraying water.

Each of the resulting products was submitted for determination of its powder X-ray diffraction pattern (XRD analysis). The powder specimens for XRD were prepared in a dry box by loading the sample onto a conventional aluminum holder and then covering the sample holder with Mylar film to exclude moisture and air. A Philips XRG 3100 XRD apparatus was employed having a variable divergent slit, a 0.005 mm receiving slit, and a graphite monochromometer, using CuKα rays produced by a 40 KV, 25 m A generator. A 1½ hour scan of $2\theta = 0°-90°$ was made using a nitrogen purged camera.

B-1: $MgCl_2.H_2O$

The vessel was charged with 17.52 g (184 mmoles) of $MgCl_2$ containing less than 0.05 weight percent water as previously determined by volumetric gas determination of a sample reacting with Grignard reagent in tetrahydrofuran. The $MgCl_2.6H_2O$, totalling 7.48 g (36.8 mmoles), was charged in 3 portions, allowing 1 hour of milling between additions and a final milling period of 2 hours. Each portion was charged to the vessel in a dry box. The vessel was cooled with spraying water during the milling process.

After milling, the vessel was returned to the dry box and unloaded through a sieve yielding a free flowing white powder. A sample of the product was analyzed by XRD. The X-ray pattern is reproduced in FIG. 1 and the observed pattern is compared with the literature reported "d" spacings for $MgCl_2.H_2O$ prepared by other known methods in Table I.

TABLE 1

| Observed $2\theta$ | Calculated "d" spacing | Literature "d" spacing for $MgCl_2.H_2O$ | Literature $I/I_1$ Intensities for $MgCl_2.H_2O$ |
|---|---|---|---|
| 12.60 | 7.04 | 7.1 | 35 |
| 15.45 | 5.73 | 5.75 | 45 |
| 19.90 | 4.47 | 4.39 | 15 |
| Obscured by Mylar Peak | | 3.40 | 25 |
| 30.90 | 2.89 | 2.88 | 100 |
| 32.75 | 2.73 | 2.74 | 62 |
| 33.95 | 2.65 | 2.62 | 10 |
| 35.50 | 2.53 | 2.51 | 25 |
| 37.50 | 2.40 | 2.39 | 5 |
| 38.40 | 2.35 | 2.33 | 25 |
| 39.80 | 2.27 | 2.25 | 35 |
| — | — | 2.09 | 15 |
| 48.08 | 1.90 | 1.88 | 40 |
| 50.32 | 1.82 | 1.81 | 40 |
| 53.90 | 1.70 | 1.72 | 10 |
| 55.40 | 1.66 | 1.66 | 15 |
| 57.70 | 1.60 | 1.59 | 10 |
| 60.10 | 1.54 | 1.52 | 15 |
| 63.20 | 1.47 | 1.47 | 10 |
| 64.90 | 1.44 | 1.43 | 10 |
| 66.30 | 1.41 | 1.40 | 5 |
| 67.80 | 1.38 | 1.37 | 5 |
| 73.90 | 1.28 | 1.28 | 10 |

B-2. $MgCl_2.2H_2O$

The vessel containing the steel balls was taken into the dry box and charged with a 12.09 g (127 mmoles) sample of the anhydrous $MgCl_2$ used in B-1 and 12.91 g (63.5 mmoles) of $MgCl_2.6H_2O$. The contents were milled 4 hours, cooling the vessel with spraying water. The product was recovered as before yielding 24.1 g (96%) as a free flowing white powder containing a few larger aggregates.

Figure 2:
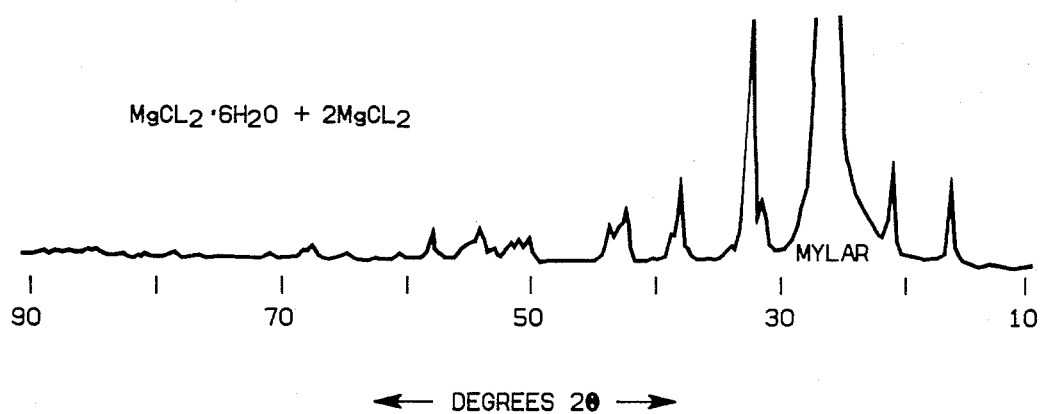

A sample of the product was analyzed by XRD. The X-ray pattern is reproduced in FIG. 2 and the data are given in tabular form. The observed pattern is compared to the literature reported "d" spacings for $MgCl_2.2H_2O$ prepared by other known methods in Table 2.

TABLE 2

| Observed Degrees $2\theta$ | Calculated "D" spacing | Literature "D" spacing for $MgCl_2.2H_2O$ | Literature $I/I_1$ Intensities for $MgCl_2.2H_2O$ |
|---|---|---|---|
| 15.98 | 5.54 | 5.55 | 30 |
| 20.80 | 4.27 | 4.28 | 30 |
| Obscured by Mylar Peak | | 3.95 | 4 |
| 31.25 | 2.86 | 2.86 | 13 |

TABLE 2-continued

| Observed Degrees 2θ | Calculated "D" spacing | Literature "D" spacing for MgCl$_2$.2H$_2$O | Literature I/I$_1$ Intensities for MgCl$_2$.2H$_2$O |
|---|---|---|---|
| 32.25 | 2.77 | 2.76 | 100 |
| 33.70 | 2.66 | 2.64 | 4 |
| 37.85 | 2.37 | 2.37 | 40 |
| 38.50 | 2.34 | 2.32 | 5 |
| 42.30 | 2.13 | 2.12 | 25 |
| 42.70 | 2.12 | — | — |
| 43.50 | 2.08 | 2.07 | 13 |
| 50.00 | 1.82 | 1.82 | 10 |
| 50.72 | 1.80 | 1.80 | 9 |
| 51.45 | 1.77 | 1.77 | 10 |
| 52.74 | 1.73 | 1.73 | 4 |
| 54.00 | 1.70 | — | — |
| 54.64 | 1.68 | 1.69 | 9 |
| 55.35 | 1.60 | 1.66 | 4 |
| 57.90 | 1.59 | 1.59 | 15 |
| 60.40 | 1.53 | 1.53 | 4 |
| 62.30 | 1.49 | 1.49 | 2 |
| 64.70 | 1.44 | 1.44 | 6 |
| 67.40 | 1.39 | — | — |
| 68.10 | 1.38 | 1.38 | 8 |
| 70.90 | 1.33 | 1.33 | 6 |
| Not Observed | | 1.29 | 1 |
| 74.80 | 1.27 | 1.27 | 1 |
| 76.50 | 1.24 | 1.24 | 1 |
| 78.40 | 1.23 | 1.22 | 4 |
| 82.50 | 1.17 | — | — |
| 84.70 | 1.14 | — | — |

B-3. MgCl$_2$.4H$_2$O

The vessel containing the steel balls was taken into the dry box and charged with a 4.74 g (49.8 mmoles) sample of the anhydrous MgCl$_2$ used in B-1 and 20.26 g (99.7 mmoles) of MgCl$_2$.6H$_2$O. The contents were milled 4.0 hours, cooling the vessel with spraying water. The product was recovered as before yielding a free flowing white powder weighing 22.9 g (92%) containing many aggregates.

Figure 3:
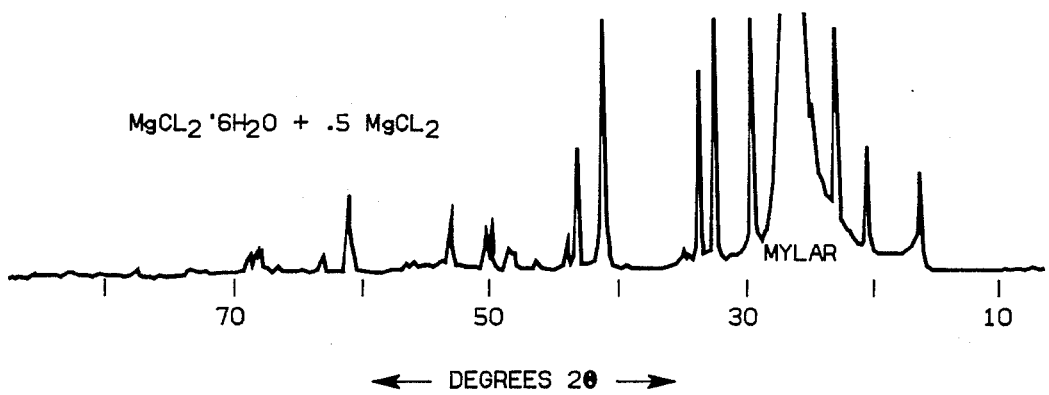

A sample of the product was analyzed by XRD. The X-ray pattern is reproduced in FIG. 3 and the observed pattern is compared to the literature reported "d" spacings for MgCl$_2$.4H$_2$O prepared by other known methods in Table 3.

TABLE 3

| Observed Degrees 2θ | Calculated "D" spacing | Literature "D" spacing for MgCl$_2$.4H$_2$O | Literature I/I$_1$ Intensities for MgCl$_2$.4H$_2$O |
|---|---|---|---|
| 16.18 | 5.47 | 5.50 | 30 |
| 20.30 | 4.37 | 4.40 | 20 |
| 22.68 | 3.92 | 3.92 | 40 |
| 24.54 | 3.62 | 3.65 | 2 |
| Obscured by Mylar Peak | | 3.48 | 20 |
| 29.48 | 3.03 | 3.02 | 60 |
| 32.40 | 2.76 | 2.76 | 80 |
| 33.60 | 2.66 | 2.66 | 40 |
| 34.38 | 2.61 | — | — |
| 24.90 | 2.57 | — | — |
| 41.08 | 2.20 | 2.20 | 100 |
| 43.00 | 2.10 | 2.10 | 40 |
| 43.90 | 2.06 | 2.05 | 2 |
| 46.23 | 1.96 | 1.98 | 4 |
| 48.00 | 1.89 | 1.89 | 12 |
| 48.30 | 1.88 | — | — |
| 49.70 | 1.83 | 1.83 | 20 |
| 50.18 | 1.82 | — | — |
| 53.00 | 1.73 | 1.73 | 20 |
| 55.70 | 1.65 | — | — |
| 56.50 | 1.63 | 1.63 | 2 |
| 61.00 | 1.52 | 1.52 | 40 |
| 63.08 | 1.47 | 1.47 | 8 |
| 66.17 | 1.41 | — | — |
| 66.60 | 1.40 | — | — |
| 67.30 | 1.39 | — | — |

TABLE 3-continued

| Observed Degrees 2θ | Calculated "D" spacing | Literature "D" spacing for MgCl$_2$.4H$_2$O | Literature I/I$_1$ Intensities for MgCl$_2$.4H$_2$O |
|---|---|---|---|
| 67.70 | 1.38 | — | — |
| 68.10 | 1.37 | 1.37 | 20 |
| 68.78 | 1.36 | — | — |
| 72.10 | 1.31 | 1.31 | 2 |
| 73.30 | 1.29 | 1.29 | 2 |
| 75.60 | 1.26 | 1.26 | 2 |
| 77.43 | 1.23 | 1.23 | 2 |
| 80.13 | 1.20 | 1.20 | 2 |
| 82.60 | 1.17 | 1.17 | 2 |
| 85.30 | 1.14 | 1.14 | 2 |
| 88.90 | 1.10 | 1.10 | 4 |

B-4 MgCl$_2$.1.50 H$_2$O

The vessel containing the dry, clean steel balls was taken into the dry box and charged with a 14.61 g (153 mmoles) sample of the anhydrous MgCl$_2$ used in B-1 and 10.39 g (51.0 mmoles) of MgCl$_2$.6H$_2$O. The contents were milled 4.0 hours, cooling the vessel with spraying water. The product was recovered as before yielding a free flowing white powder containing a few aggregates.

Figure 4:
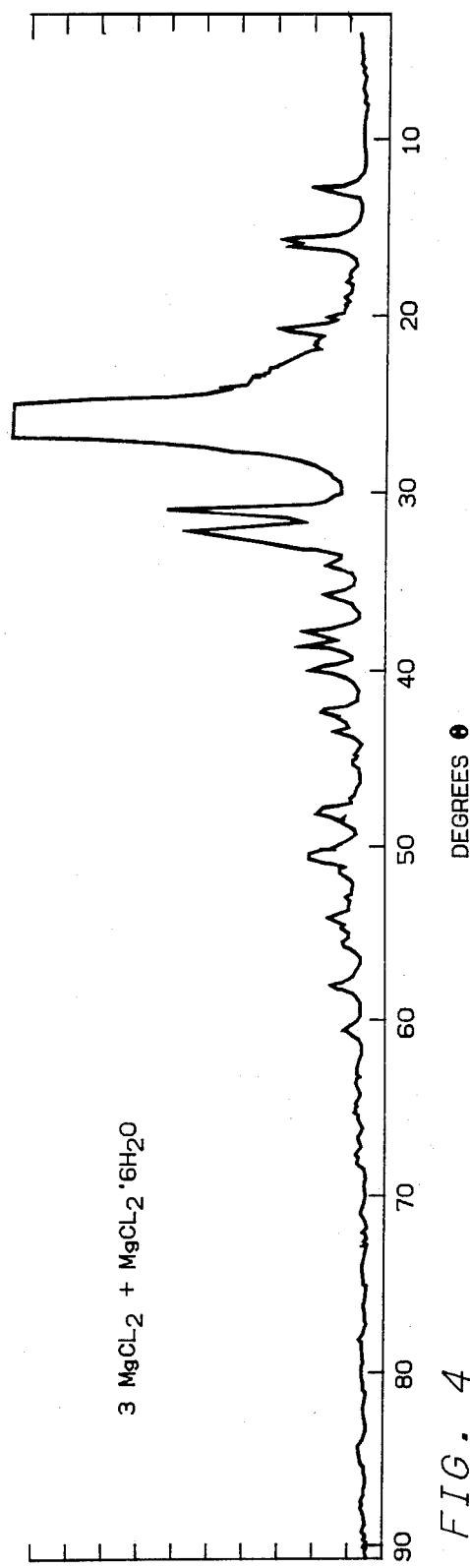

XRD spectrum of the product is shown in FIG. 4. A comparison of the peaks in FIG. 4 to those of MgCl$_2$.H$_2$O and MgCl$_2$.2H$_2$O, FIGS. 1 and 2, reveal that MgCl$_2$."1.5H$_2$O" is in reality a mixture of the known hydrates, MgCl$_2$.H$_2$O and MgCl$_2$.2H$_2$O.

Figure 5:
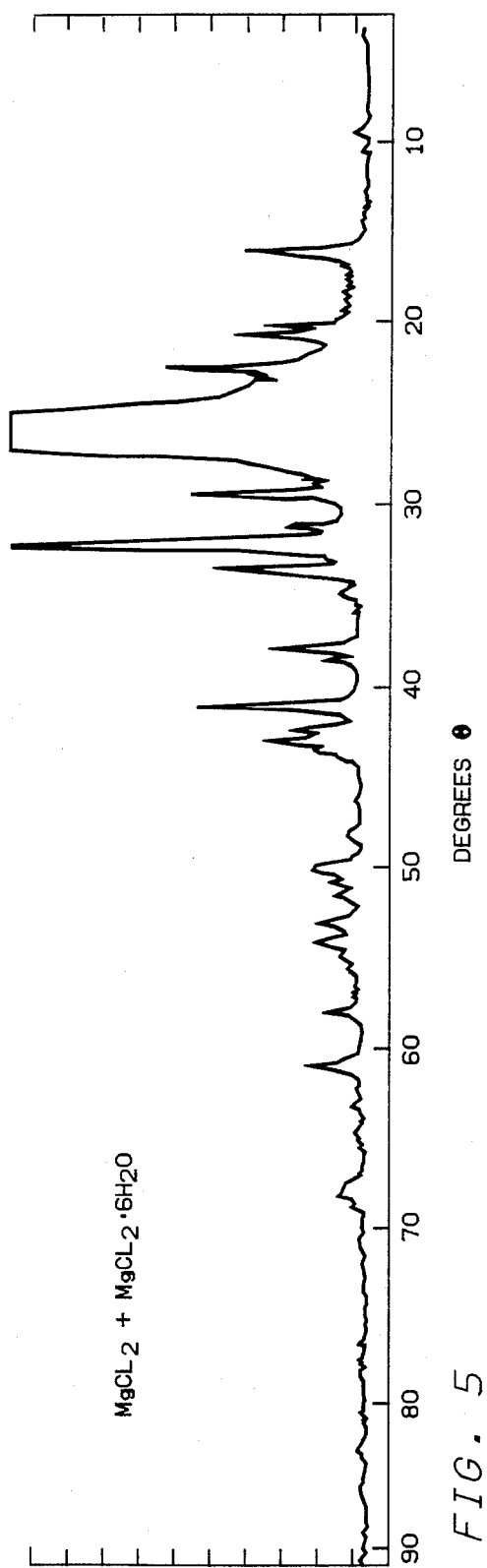

Similarly, a ball milled preparation of MgCl$_2$."3H$_2$O" was made from anhydrous MgCl$_2$ and MgCl$_2$.6H$_2$O. XRD spectra of MgCl$_2$."3H$_2$O" are shown in FIG. 5. In comparing peaks of the spectra for MgCl$_2$.2H$_2$O (FIG. 2), of MgCl$_2$."3"H$_2$O (FIG. 5) and of MgCl$_2$.4H$_2$O (FIG. 3), it is apparent that MgCl$_2$."3H$_2$O" is in reality a mixture of the known hydrates, MgCl$_2$.2H$_2$O and MgCl$_2$.4H$_2$O.

EXAMPLE II - CATALYST PREPARATION

The hydrated MgCl$_2$ used in the catalyst preparations described below was produced by ball milling appropriate quantities of anhydrous MgCl$_2$ and MgCl$_2$.6H$_2$O as in Example I.

The catalysts were prepared by following the three step procedure:

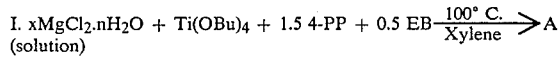

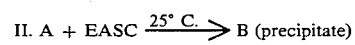

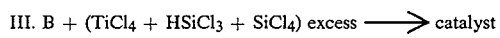

wherein
Ti(OBu)$_4$ is titanium tetra-n-butoxide
4-PP is 4-phenylphenol
EB is ethyl benzoate
EASC is ethylaluminum sesquichloride as a 25 weight percent solution in n-heptane
Halide mixture in step III is formed by mixing 360 mL of TiCl$_4$ (621 g, 3.28 moles), 270 mL of HSiCl$_3$ (362 g, 2.68 moles) and 90 mL of SiCl$_4$ (135 g, 1.19 moles). About 100 mL of the mixture is employed. $1.2 < x < 2$ and $0 < n < 4$ The catalysts were prepared as follows in steps I, II and III.

I. Under argon, in a dry box in quart (0.9 L) glass beverage bottles equipped with magnetic stirring bars were mixed 19.8 g MgCl$_2$.nH$_2$O (about 0.1 mole depending upon the value of n), 25 g (0.15 mole) of 4-PP, 35.8 mL (0.105 mole) of Ti(OBu)$_4$ and 150 mL of mixed xylenes. The samples were heated for 15 minutes at 100° C., then 7.5 mL (0.05 mole) of EB was added and the samples were heated an additional 45 minutes at 100° C. yielding solution A.

II. Solution A was diluted with 500 mL of xylenes at about 25° C. and then reacted with 125 mL (0.39 mole) of the EASC solution, added dropwise, to give precipitate B. The precipitate was isolated by centrifugation, washed free of reactants and/or by-products by repeated slurrying in n-hexane and centrifuging, and then dried by standing overnight in the dry box.

III. 20 g of the purified, dried step II solids was charged to a quart bottle containing a magnetic stirring bar while in the dry box and slurried in the halides mixture using a sufficient amount to allow free stirring. The mixture was stirred for 1 hour at 100° C. and the product recovered by vacuum filtration, washed with sufficient n-hexane to give a colorless filtrate and dried as above. Each catalyst was bottled and kept in the dry box until used for 1-olefin polymerization testing.

The results of the catalyst preparations are summarized in Table 4.

stirring are discontinued, the reactor contents are dumped or otherwise removed, the reactor is flushed with dry nitrogen and then with propylene vapor.

While continuing the propylene purge, through an entry port in the reactor is charged in order, the TEA-.EA mixture (or variation thereof), the solid catalyst and the DEAC (if used). The port is sealed and the reactor is filled about ⅔ full with liquid propylene and hydrogen added (if used). The hydrogen can be added from a pressurized container of known volume in terms of pressure drop, e.g. 10 psi. Heating is started. When the desired reactor temperature is reached, e.g. 70° C., the reactor is filled liquid full with propylene and maintained liquid full during the run by means of a propylene reservoir open to the reactor overpressured with dry nitrogen, e.g. about 515 psia (3.55 MPa).

Each run is terminated by discontinuing the heating, cooling the reactor below about 60° C., discontinuing the stirring and venting unreacted propylene from the reactor into a dry, tared container. It is convenient to do this by employing a dip tube with a porous end in the reactor. The reactor is filled with fresh propylene and the contents are stirred several minutes to wash the polymer. The washed propylene is then discharged to the tared container.

The polymer in the reactor is recovered, dried if necessary, to remove propylene and weighed to deter-

TABLE 4

| | | Catalyst Preparations | | | | | |
|---|---|---|---|---|---|---|---|
| Sample No. | Mol Ratio H$_2$O/MgCl$_2$ | Mole Ratios[a] Ti:Mg:H$_2$O | Part II Solid Color | Wt., g | Part III Solid (Catalyst) Color | g | Yield, %[b] |
| 1 | <0.05 | 1.00:2:0.00 | yellow | 34.7 | lt. purple | 17.1 | 85 |
| 2 | <0.05 | 1.00:2:0.00 | yellow | 38.2 | lt. purple | 17.4 | 87 |
| 3 | 0.25 | 1.00:2:0.50 | yellow | 56.1 | lt. purple | 14.1 | 70 |
| 4 | 0.50 | 1.05:2:1.00 | burnt orange | 35.9 | lt. purple | 15.8 | 79 |
| 5 | 0.75 | 1.11:2:1.50 | burnt orange | 36.9 | lt. purple | 14.6 | 73 |
| 6 | 1.0 | 1.11:2:2.00 | brown | 33.7 | dark purple | 14.2 | 71 |
| 7 | 1.25 | 1.17:2:2.500 | burnt orange | 31.5 | purple | 16.8 | 84 |
| 8 | 1.50 | 1.25:2:3.00 | light orange | 24.4 | purple | 15.9 | 79 |
| 9 | 1.75 | 1.25:2:3.50 | light orange | 26.7 | purple | 17.9 | 89 |
| 10 | 2.0 | 1.33:2:4.00 | orange | 30.5 | purple | 21.9 | 109 |
| 11 | 4.0 | 1.67:2:8.00 | yellow | 45.6 | brown | 26.6 | 133 |

[a]Mole ratios of starting materials in step I of catalyst preparation.
[b]Based on starting with 20.0 g of step II solid.

Subsequent propylene polymerization tests with the catalysts showed that the most active ones (samples 4–10) were purple powders containing about 5.5 weight percent Ti as determined from plasma emission results.

EXAMPLE III

Propylene Polymerization

A sample of the catalyst is tested in propylene polymerization for 1 hour at 70° C., or as specified, by employing a liquid full, 1 liter, stirred, stainless steel reactor in the presence of the specified cocatalyst system and hydrogen, if used. A typical cocatalyst system, for example, can consist of a premixed composition containing 2 mmoles triethylaluminum (TEA) and 1 mmole ethyl anisate (EA) which can be used in combination with 2 mmoles of diethylaluminum chloride (DEAC).

Prior to each run, the reactor is conditioned by filling it about ½ full with n-hexane dried with alumina and then heating reactor and contents with stirring for about 10–15 minutes at over 100° C., e.g. 135° C. Heating and mine the yield. The polymer can be stabilized by slurrying it in an acetone solution containing a conventional antioxidant system for polypropylene and the solvent removed by heating the mixture for about 3 hours at 60° C. in a vacuum oven.

Propylene soluble polymer contained in the propylene contained in the tared vessel is determined by heating the vessel to dryness in a vacuum oven at about 60° C. The vessel is then weighed to ascertain the weight of residue remaining. Xylene-soluble polymer, calculated productivity of the solid catalyst, and other physical properties of the polymer, if specified, are determined as disclosed in A.S. No. 4,394,291.

Table 5 sets forth the results of tests of the catalysts of Example II in propylene polymerization at 70° C., 10 psi hydrogen and a cocatalyst system consisting of 2.0 mmoles of triethylaluminum (TEA) premixed with 1.1 mmoles of ethyl anisate (EA) and 2.0 mmoles of diethylaluminum chloride (DEAC) by employing the process described as related before.

TABLE 5

Propylene Polymerization
1 Hour at 70° C., 10 psi Hydrogen Present

| Run No. | Catalyst No. | n[f] | Productivity[a] kg/g/hr | Percent Solubles C₃= | Percent Solubles xylene | Percent Solubles total | Density[b] g/cc | Polymer MF[c] 230° C. g/10 min | Polymer Flex[d] Mod. MPa | Polymer Bulk Density g/cc |
|---|---|---|---|---|---|---|---|---|---|---|
| 1P | 1 | <0.05 | 2.3 | 2.4 | 2.3 | 4.7 | 0.9082 | 1.5 | 1514 | 0.25 |
| 2P | 2 | " | 2.4 | 3.3 | 3.5 | 6.8 | 0.9075 | 4.2 | 1450 | 0.23 |
| 3P | 3 | 0.25 | 1.2 | 6.9 | 4.0 | 10.9 | 0.9064 | — | — | — |
| 4P | 4 | 0.50 | 5.7 | 4.5 | 2.2 | 6.7 | 0.9060 | 7.3 | — | — |
| 5P | 5 | 0.75 | 13.0 | 2.5 | 2.0 | 4.5 | 0.9079 | 3.5 | — | — |
| 6P | 6 | 1.0 | 15.8 | 1.6 | 3.0 | 4.6 | 0.9079 | 3.7 | 1447 | 0.28 |
| 7P | 7 | 1.25 | 24.9 | 1.6 | 3.7 | 5.3 | 0.9068 | 4.7 | 1533 | 0.30 |
| 8P | 8 | 1.50 | 25.9 | 1.1 | 4.2 | 5.3 | 0.9062 | 5.1 | 1442 | 0.38 |
| 9P | 9 | 1.75 | 11.2 | 6.8 | 7.9 | 13.7 | 0.9069 | 7.6 | — | — |
| 10P | 10 | 2.0 | 5.8 | 2.1 | 7.9 | 10.0 | 0.9028 | 6.9 | 1213 | 0.36 |
| 11P | 11 | 4.0 | 1.2 | 17.7 | 12.4 | 29.9 | 0.9003 | 10.0 | — | — |

[b]ASTM D 1505
[c]ASTM D 1238, condition L
[d]ASTM D 790
[a]Based on step 1 of catalyst preparation
[f]n is the amount of water in the MgCl₂.nH₂O used in making the catalyst.
c₃= under Solubles heading is propylene Inspection of the data presented in Table 5 clearly shows that the presence of water in the ball milled hydrated MgCl₂ used in step I of the catalyst preparations can be beneficial depending upon the amount used. Based on productivity results alone, it is evident in runs 4P–10P, that a water level ranging from about 0.5 to about 2.0 moles H₂O per mole of MgCl₂ is desirable. When taking into account both productivity and total solubles produced it is clear that a water level ranging from about 0.5 to about 1.5 moles per mole MgCl₂ and more preferably about 0.75 to about 1.5 moles H₂O per mole MgCl₂ represent most desirable levels to use. In comparing runs 5P and 6P with control runs 1P and 2P, the results show at about the same total solubles level that productivity has increased about 5 to 6 fold. In comparing the most productive runs 7P and 8P with control runs 1P and 2P, the data show at about the same total solubles level that productivity has increased about 10 to 11 fold. When the water level reaches and surpasses about 1.75 moles per mole MgCl₂ run 9P shows a total solubles level of about 14 weight percent although productivity is still high at about 11 kg polymer per g solid catalyst per hour. Runs 10P and 11P show, at water levels ranging from 2 to 4 moles per mole MgCl₂ that total solubles are high and productivity is drastically reduced.

When the water level is about 0.25 moles per mole MgCl₂ or less the results show that productivity is relatively low and total solubles may range from about 5 to about 10 weight percent.

EXAMPLE IV

Ethylene Polymerization

Samples of the previous catalysts were also tested for ethylene polymerization under particle form conditions in a stirred, stainless steel reactor of 3.8 liter capacity. Before each run, the reactor was conditioned by adding about 2 liters of n-heptane dried over alumina and then heating reactor and contents for about 15–30 minutes at 170° C. with stirring. Heating and stirring are discontinued, the reactor contents are discharged and the reactor is flushed with isobutane.

Under purging isobutane vapor, the reactor is charged in order with 0.455 mmoles TEA (0.5 mL) as a 15 weight percent solution in n-heptane, the weighed solid catalyst (about 5 mg), and 2L of isobutane. Hydrogen, 50 delta psi, measured as pressure drop from a charged 2.3 L vessel is added and the reactor is heated to 100° C. Ethylene is then added to provide a total reactor pressure of 500 psia (3.5 MPa) and the run is started. Ethylene is added on demand from a reservoir during the run as needed. The run is terminated by discontinuing heating and stirring and venting the gaseous components. The polymer is recovered, dried if needed, weighed to ascertain the yield, and stabilized by slurrying it with an acetone solution containing sufficient conventional antioxidant package to provide 0.5 weight percent antioxidant based on the dry mixture.

The results are presented in Table 7.

TABLE 7

ETHYLENE POLYMERIZATION
1 HOUR AT 100° C., 50 PSI HYDROGEN PRESENT

| Run No. | Catalyst No. | n | Productivity[b] kg/g/hr | Polymer MI[c] g/10 min |
|---|---|---|---|---|
| 1E | 1 | <0.05 | 18.9 | 0.83 |
| 2E | 3 | 0.25 | 3.1 | 0.94 |
| 3E | 3 | " | 3.8 | 0.69 |
| 4E | 4 | 0.50 | 104.0 | 1.2 |
| 5E | 4 | " | 57.8 | 1.4 |
| 6E | 4 | " | 67.3 | 0.74 |
| 7E | 5 | 0.75 | 63.4 | 0.69 |
| 8E | 5 | " | 67.1 | 0.67 |
| 9E | 6 | 1.0 | 30.2 | 1.5 |
| 10E | 7 | 1.25 | 39.9 | 0.84 |
| 11E | 8 | 1.50 | 31.4 | 0.62 |
| 12E | 9 | 1.75 | 42.6 | 0.55 |
| 13E | 10 | 2.0 | 22.0 | 0.55 |
| 14E | 11 | 4.0 | 6.3 | 0.15 | n is the amount of water in the MgCl₂.nH₂O employed.
[b]kg polymer per g solid catalyst per hour.
[c]ASTM D 1238, condition E Inspection of the data in Table 7 show that when the catalyst is prepared with the addition of 0.5 to 0.75 moles H₂O per mole of MgCl₂, invention runs 4E–8E, a 3 to 5 fold increase in activity results relative to catalysts prepared from anhydrous MgCl₂, control run 1E. At less than 0.5 mole H₂O per mole MgCl₂ in catalyst preparation, the results of about 3–4 kg polymer per g solid catalyst per hour in runs 2E, 3E are substantially inferior to those of control run 1E. WIth catalysts made with about 1 to 2 moles H₂O per mole MgCl₂, the productivity results of invention runs 9E to 13E, although poorer than those of invention runs 4E to 8E, are still about 1.2 to about 2.2 fold greater than shown in control run 1E. The poor productivity results in control run 14E using a catalyst made with 4 moles H₂O per mole MgCl₂ clearly shows that too much water is very detrimental in preparing catalysts of the type described in this invention.

It is evident that a narrow range of water content in catalyst preparation results in increased ethylene polymerization as in propylene polymerization. However, whereas optimum results in ethylene polymerization are obtained when the catalyst is prepared in the presence of 0.5 to 0.75 moles H₂O per mole MgCl₂, in propylene polymerization the best results are obtained when the catalyst is prepared in the presence of 0.75 to 1.5 moles H₂O per mole MgCl₂.

What is claimed is:

1. A process for preparing a catalyst useful for the polymerization of olefins comprising reacting a hydrous magnesium dihalide composition with reactants comprising a benzoic acid ester and an alkoxytitanium compound to form a first catalyst component, then reacting said first catalyst component with an organoaluminum halide to form a solid product, then reacting said solid product with a halogenating agent comprising a titanium halide, wherein the molar ratio of water to magnesium dihalide in said hydrous magnesium dihalide composition is in the range of about 0.5/1 to 2/1 and the hydrous magnesium dihalide composition is prepared by comminuting a mixture of an anhydrous magnesium dihalide and a hydrous magnesium dihalide at least until the amount of the most highly hydrated magnesium dihalide species in the comminuted product has become substantially stabilized.

2. A process according to claim 1 wherein said hydrous magnesium dihalide composition is substantially free of any tetra- or hexa-hydrous magnesium dihalide species.

3. A process according to claim 2 wherein said anhydrous magnesium dihalide comprises anhydrous MgCl₂ and said hydrous magnesium dihalide comprises hydrous MgCl₂.

4. A process according to 3 wherein said mixture of hydrous MgCl₂ and anhydrous MgCl₂ is comminuted by ball milling.

5. A process according to claim 4 wherein said alkoxytitanium compound comprises a compound of the formula Ti(OR)₄ wherein each R is individually selected from alkyl groups containing 1 to 20 carbon atoms, and wherein said organoaluminum halide comprises ethyl aluminum sesquichloride.

6. A process according to claim 5 wherein a phenol is also employed in the production of said first catalyst component.

7. A process according to claim 6 wherein said ester comprises ethyl benzoate and said phenol comprises 4-phenylphenol.

8. A process according to claim 7 wherein said halogenating agent comprises titanium tetrachloride, HSiCl₃, and SiCl₄.

9. A process according to claim 7 wherein said titanium compound is titanium tetra-n-butoxide.

10. A process according to claim 9 wherein said halogenating agent comprises titanium tetrachloride, HSiCl₃, and SiCl₄.

11. A catalyst produced by the process of claim 1.

12. A process according to claim 4 wherein said hydrous magnesium dichloride is MgCl₂.6H₂O.

13. A process according to claim 12 wherein the molar ratio of water to magnesium dihalide in said hydrous magnesium dihalide composition is in the range of 0.75/1 to 1.5/1.

14. A process according to claim 12 wherein the molar ratio of water to magnesium dihalide is in the range of 0.511 to 0.7511.

* * * * *